Dec. 22, 1953  H. KERSHAW  2,663,852
SOCKET FOR FLUORESCENT LAMPS AND THE LIKE
Filed Dec. 26, 1951  3 Sheets-Sheet 1
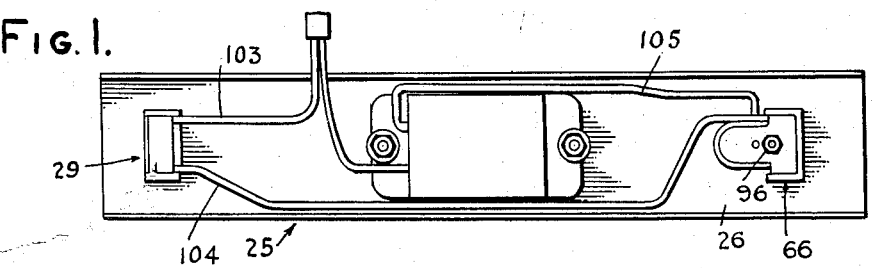
Fig. 1.
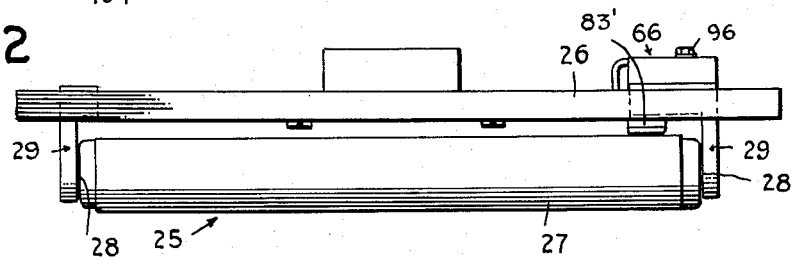
Fig. 2
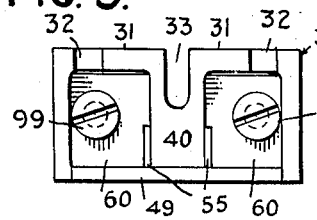
Fig. 3.
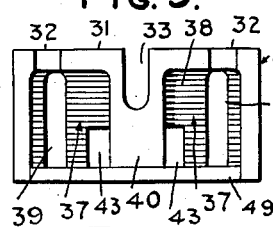
Fig. 5.
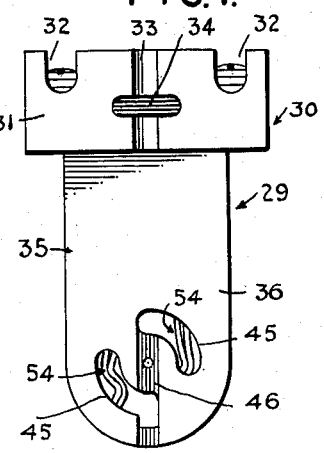
Fig. 7.
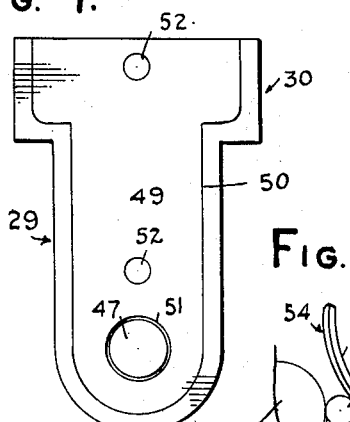
Fig. 4.
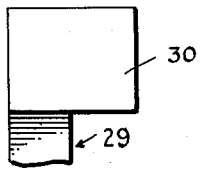
Fig. 6.
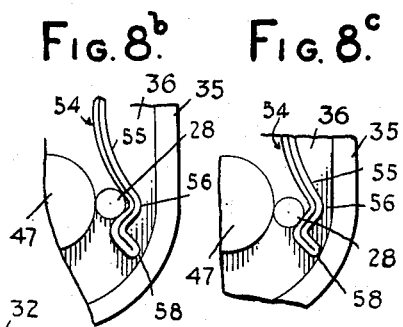
Fig. 8ᵇ.  Fig. 8ᶜ.
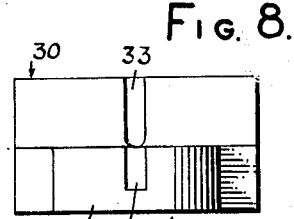
Fig. 8.
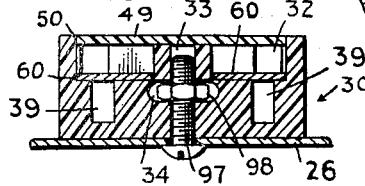
Fig. 8ᵃ.
INVENTOR
HENRY KERSHAW
BY
ATTORNEY

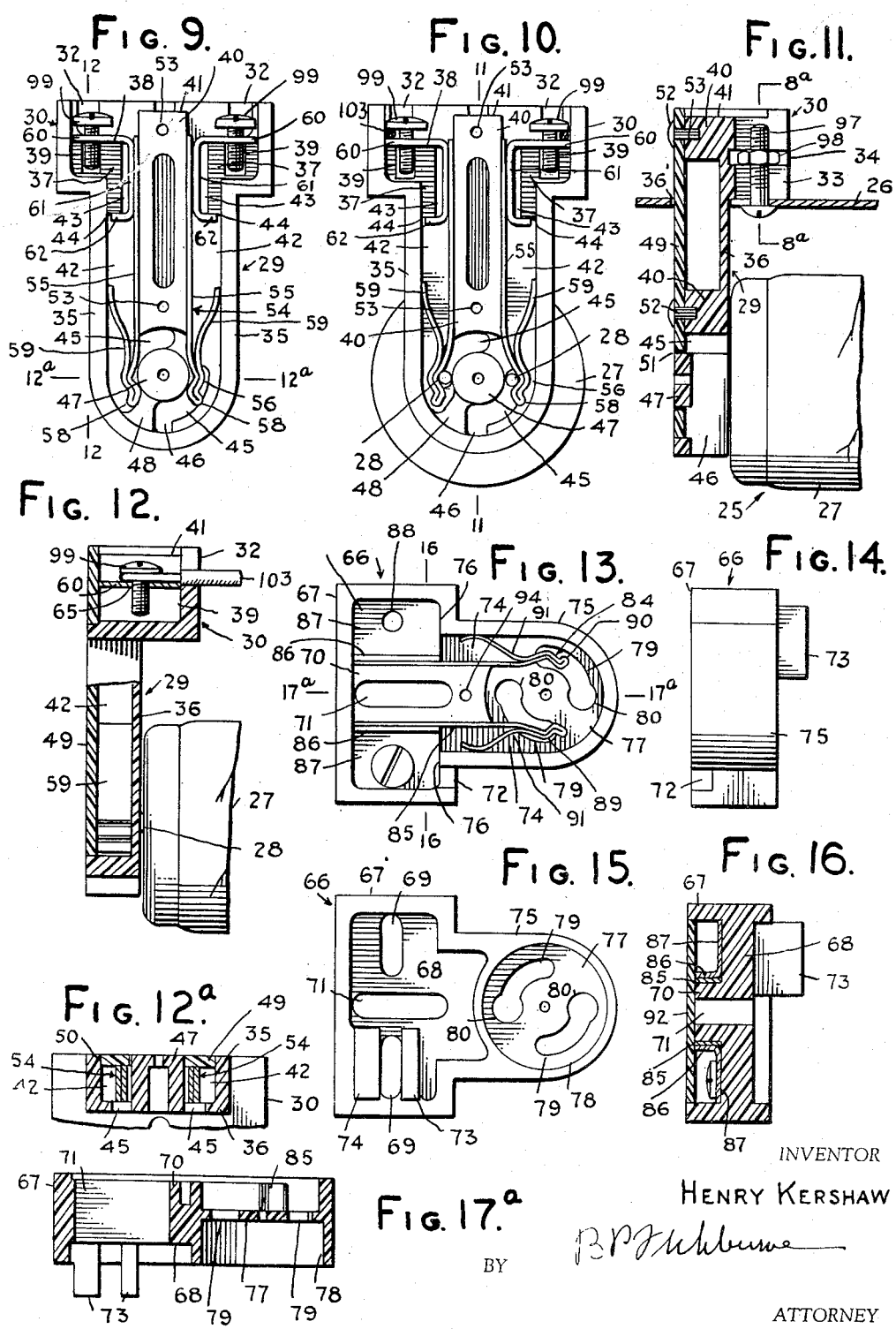

Dec. 22, 1953     H. KERSHAW     2,663,852
SOCKET FOR FLUORESCENT LAMPS AND THE LIKE
Filed Dec. 26, 1951     3 Sheets-Sheet 3
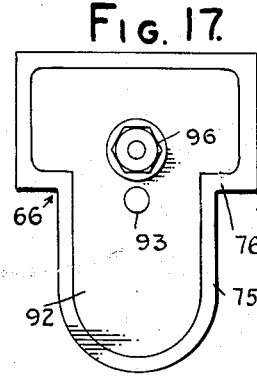
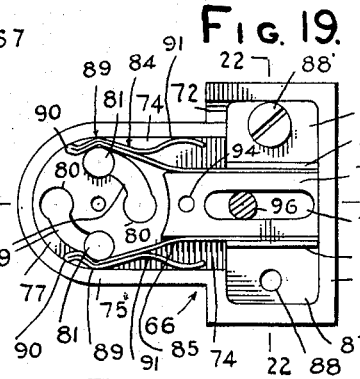
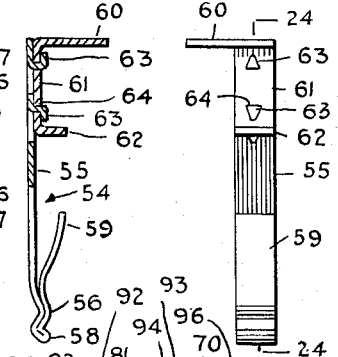
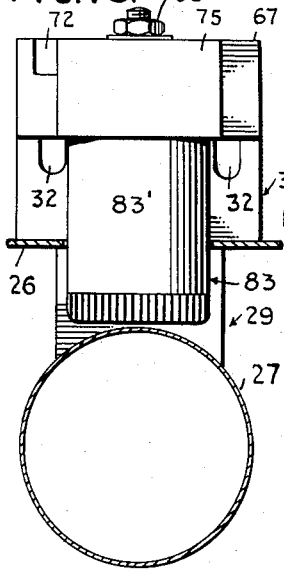
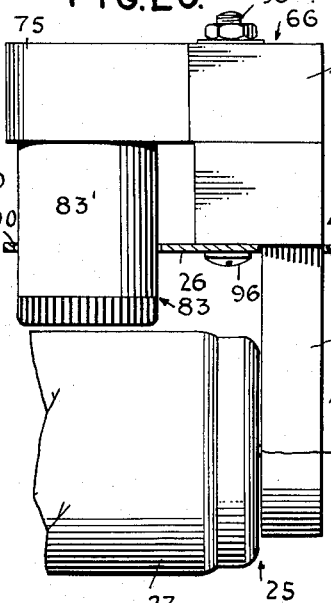
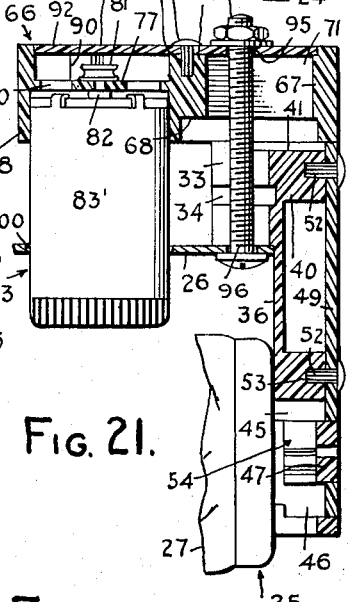
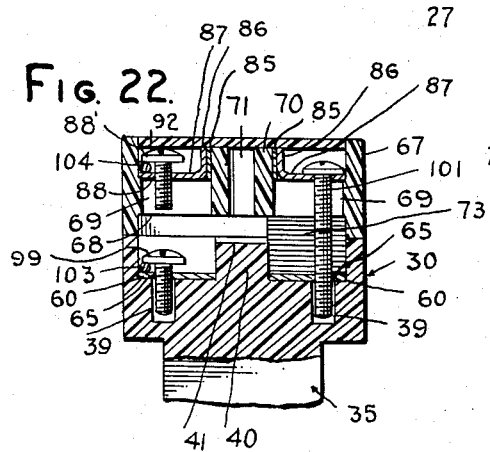
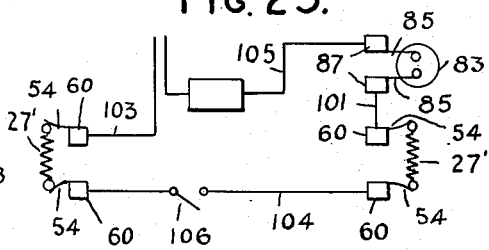
INVENTOR
HENRY KERSHAW
BY
ATTORNEY Patented Dec. 22, 1953

2,663,852

UNITED STATES PATENT OFFICE 2,663,852

SOCKET FOR FLUORESCENT LAMPS AND THE LIKE

Henry Kershaw, Belleville, N. J.

Application December 26, 1951, Serial No. 263,316

2 Claims. (Cl. 339—53)

My invention relates to sockets for tube lamps, such as fluorescent lamps, and switches used in connection with such lamps.

An important object of the invention is to provide a socket of the above-mentioned character having contacts which possess a high degree of resiliency to effect a proper electrical contact with the terminals of the lamp or the like and will positively hold the terminals against accidental displacement so that the lamp cannot improperly drop.

A further object of the invention is to provide a socket of the above-mentioned character having contacts provided with means for producing a high resilient force adjacent to the free ends of the contacts, to effect a proper electrical contact with the terminals of the lamp or the like.

A further object of the invention is to provide contacts having two-layer terminal engaging heads, for increasing the strength of the heads, which are resilient, so that such heads will render increased resistance to the removal of the terminals, thereby preventing improper removal of the lamp or the like.

A further object of the invention is to arrange the binding posts of the assembled lamp socket and switch socket at the bases of the sockets.

A further object of the invention is to provide means for simplifying the attachment of the wires to the binding posts of the sockets.

A further object of the invention is to provide means for economizing in the use of expensive metals in forming the contacts.

A further object of the invention is to improve the construction of the casing or housing of the socket, re-inforcing the same, and thereby increasing its strength and durability.

Other objects and advantages of the invention will be apparent during the course of the following description.

In the accompanying drawings forming a part of this application and in which like numerals are employed to designate like parts throughout same, Figure 1 is a plan view of a fluorescent lamp assembly showing my improved sockets in place therein, Figure 2 is a side elevation of the same, Figure 3 is a plan view of the lamp socket, showing the terminal plates in position, Figure 4 is an outer side elevation of the housing included in the lamp socket, Figure 5 is a plan view of the socket shown in Figure 3, with the terminal plates removed, Figure 6 is an edge elevation of the same, parts broken away, Figure 7 is an inner side elevation of the socket, Figure 8 is a bottom plan view of the same, Figure 8a is a vertical transverse section taken on line 8a—8a of Figure 11, Figure 8b is an enlarged outer side elevation of the socket, with the cover removed, showing the relative position of the lamp terminal and contact head and housing when the terminal is held within the contact head, Figure 8c is a similar view showing the flexing of the two-layer terminal head upon the removal of the terminal from the head, Figure 9 is an outer side elevation of the socket, the side cover being removed, and the contacts in the inner position before the terminals are inserted in place, Figure 10 is a similar view, showing the resilient contacts moved outwardly by the terminals, Figure 11 is a longitudinal section taken on line 11—11 of Figure 10, Figure 12 is a vertical section taken on line 12—12 of Figure 9, Figure 12a is a horizontal section taken on line 12a—12a of Figure 9, Figure 13 is a plan view of the switch socket, the contacts being in place therein, Figure 14 is an end elevation of the same, Figure 15 is a bottom plan view of the switch socket, Figure 16 is a transverse section taken on line 16—16 of Figure 13, Figure 17a is a vertical section taken on line 17a—17a of Figure 13, Figure 17 is a plan view of the assembled switch socket and lamp socket, Figure 18 is a front elevation of the same, Figure 19 is a plan view of the assembled switch socket and lamp socket, with the cover plate removed, Figure 20 is a side elevation of the same, Figure 21 is a longitudinal section taken on line 21—21 of Figure 19, Figure 22 is a transverse section taken on line 22—22 of Figure 19, Figure 23 is a side elevation of a connected resilient contact and terminal plate, Figure 24 is a vertical section taken on line 24—24 of Figure 23, Figure 25 is a diagrammatic view showing the circuit connected with the terminal plates and associated elements.

In the drawings, where for the purpose of illustration is shown a preferred embodiment of my invention, the numeral 25 designates a tube or fluorescent lamp assembly, comprising a horizontal support 26 beneath which is arranged a fluorescent lamp 27 having pairs of terminals or pins 28 at its opposite ends. The pairs of terminals are inserted within and held by sockets 29 which are substantially identical.

Each lamp socket 29 is formed of insulating material such as "Bakelite" or other plastics material. Each lamp socket comprises an upper horizontal casing 30 which is rectangular. This casing is open at its top, closed at its inner side, and open at its outer side. The casing 30 is provided in its closed inner side 31 with upper vertical openings or grooves 32, and a deep vertical groove 33 and horizontal grooves 34, Figure 7. Formed integral with the horizontal casing 30 is a depending vertical casing 35, arranged beneath the same. The vertical casing 35 has an inner closed side 36 which is offset outwardly with respect to the side 31. The casing 35 is formed integral with lugs 37 and these lugs are integral with the casing 30 and are arranged in the bottom of the same. The lugs 37 have tops 38 and are provided with horizontal grooves 39 which extend through the tops 38. These grooves 39 have their inner ends closed and their outer ends opened. Extending longitudinally within the casing 35 and centrally thereof is a vertical web 40, formed integral therewith and integral with the lugs 37 and the inner side 31. The grooves 33 and 34 extend through this web 40. The web 40 projects above the tops 38 but has its top 41 terminating at an elevation slightly beneath the top of the horizontal casing 30. The web 40 forms recesses 42 within the vertical casing 35 and the lugs 37 form reduced passages 43 with the web 40 and these lugs have lower shoulders 44, arranged at the bottom of the passages 43. The inner sides 36 of the casings 35 are provided with curved slots 45 leading into vertical slots 46 which extend through the bottom of the casing. The slots 45 of the casing 35 to the left, Figures 2 and 7, extend clockwise from the vertical groove 46 so that the terminals or pins 28 of the fluorescent lamp may be inserted within the curved slots 45 and turned clockwise to secure the same in place. The curved slots 45 are separate and spaced and are arranged in concentric relation and extend for substantially 90 degrees each and have closed ends which positively limit the movement in one direction of the terminals 28. The slots 45 formed in the casing 35 to the right must then extend in the opposite direction with relation to the left slots 45. The slots 45 and 46 extend through the inner face of the web 40 and the lower end of the web 40 has a cylindrical head 47 formed integral therewith and extending horizontally beyond the web 40, Figure 11. The head 47 is also integral with a web 48, integral with the lower end of the casing 35. The outer side of the casing 35 is closed by a cover 49, fitting within a marginal flange 50 of the casing 35. This cover has an opening 51 to receive the head 47 and the cover 49 has openings for receiving pins 52, inserted within openings 53 formed in the web 40. These pins frictionally engage within the openings 53 for holding the cover 49, in place. The cover may have a snug fit within the marginal flange 50 and the head 47 has a snug fit within the opening 51. The cover contacts with and rests upon the lugs 37 and web 40 when held in place. The head 47 and web 40 and lugs 37 serve to strengthen and re-inforce the casing 35, preventing breakage. A particularly strong union is effected between the horizontal and vertical casings 30 and 35 on account of the arrangement of the web 40 and lugs 37.

I provide resilient contacts 54 to be mounted within the vertical casing 35. Each contact is formed of a metal strip 55 of the same width throughout its entire length. This metal strip is preferably formed of copper bronze and is relatively narrow. Each strip 55 is bent upon itself near its free end, providing a two-layer V-shaped head 56, and the layers of the head contact with each other, as shown. The V-shaped head is formed with an angular extension 58 at its free end. This angular extension 58 extends generally radially outwardly in the same direction with the V-shaped head 56. The head 56 is arranged near the closed end of the slot 45. The outer layer of the head 56 is continued in the form of a free extension 59, diverging from the strip 55. The extension 59 bears against the side wall of the recess 42 and thereby applies the resilient pressure to the strip 55 at its free end, where it is most effective. The contact 54 is formed separate from the attaching plate 60, which may be formed of brass. This attaching plate has a reduced extension 61 depending therefrom and having its lower end bent into a horizontal projection 62. Since the plate 60 is formed wider than the extension 61, and since the contact element 54 has the width of the extension 61, a considerable saving in scrap is provided by making the contact 54 separate from the plate 60. The strip 55 has tongues 63, stamped therefrom and these tongues are inserted through openings 64 formed in the extension 61 and the tongues are then bent down, whereby a secure connection and contact is effected by the strip 54 and the extension 61. These parts may be held together by other means, if desired. The plate 60 is provided with a screw-threaded opening 65.

The contacts 54 are assembled within the recesses 42 and the upper ends of the strips 55 and the extensions 61 are arranged within the passages 43. The terminal plates 60 are disposed within the horizontal casing 30 and rests upon the tops 38 of the lugs 37, while the horizontal projections 62 engage beneath the lower shoulders 44 of the lugs. The strips 55 have a width corresponding to the space between the inner side 36 and cover 49 and the contacts are thereby held in place against lateral displacement. The longitudinal displacement of the contacts 54 is prevented by the terminal plates 60 engaging the tops of the lugs and the horizontal projections 62 engaging beneath the shoulders 44. This permits of the edgewise insertion of the contacts 54 into position when the cover 49 is removed. When the contacts are arranged within the recesses 42, the ends of the outer layers 49 contact with the edge wall of the casing 35, while the angular extensions 58 of the heads 56 are arranged near and spaced from such edge wall. The angular extensions 58 project across the curved slots 45 and hence are arranged in the path of travel of the terminals 28 of the lamp. The terminals 28 are inserted up through the vertical slot 46 until they are at the intake ends of the curved slots 45, at which time the lamp is turned upon its longitudinal axis in a clockwise direction. The terminals contact with the angularly arranged extensions 58 and flex the resilient contacts 54 outwardly. This outward movement continues and shortly before the terminals 28 clear the extensions 58, such extensions are brought into contact with the edge wall of the recesses 42 and the stiff two-layer heads 56 must be flexed before the terminals can enter the recesses or notches in the V-shaped heads 56. The extension 58 is arranged sufficiently close to the wall of the recess 42 so that the two-layer head 56 must be flexed before the pin or terminal enters the notch of the head 56, as stated, and the two-layer head 56 for the same reason must be flexed before the terminal can be moved out of the notch of the V-shaped head 56. This is important as it provides a safety factor against the pin 28 improperly working out of the notch of the two-layer head.

I will now describe a socket which is similar to the sockets 29 and works upon the same principle and which is used for holding a thermostatic switch. This switch socket comprises a horizontal housing 66 which is formed of "Bakelite" or other suitable insulating plastics material. This housing comprises a transverse casing 67 having a bottom 68 provided with transverse slots 69. This bottom is thick and strong. The casing has its marginal edge extending above and below the bottom 68. Arranged within the casing 67 is a web 70, integral with the bottom and the marginal edge of the casing. This web 70 has its top surface terminating a short distance inwardly of the top of the marginal edge of the casing. This web has a longitudinal slot 71. The casing 67 is provided with a groove 72 at its inner side and the casing 67 is also provided with a pair of depending lugs 73 upon its bottom projecting below the marginal edge of the casing section 67, for a purpose to be described. The web 70 forms recesses 74 in the casing section 67, as shown.

Formed integral with the transverse casing 67 is a longitudinal casing 75, forming shoulders 76. The casing 75 has a bottom 77, Figure 21, integral with the bottom 68 and web 70. This bottom is formed integral with a cylindrical socket 78 arranged beneath it and this cylindrical socket is integral with the marginal edge of the longitudinal casing 75 and the bottom 68. The bottom 77 has curved concentric slots 79 provided with enlargements 80 at their intake ends. The bottom 77 is thin so that it may engage beneath the heads 81 of pins or terminals 82 of a thermostatic switch 83, which is biased closed when cool. This thermostatic switch has a cylindrical casing 83'. The upper end of the cylindrical casing 83' is inserted within the socket 78 and the heads 81 are passed through the enlargements 80 of the curved slots 79 and the casing is then turned clockwise so that the terminals are brought to the closed ends of the slots 79, Figure 19.

Resilient contacts 84 are provided and are mounted in the recesses 74. These contacts comprise resilient metal strips 85 of the same width throughout their entire length and the ends of these metal strips are attached to upstanding flanges 86 formed upon terminal plates 87 having screw-threaded openings 88 formed therein. These terminal plates seat within the recesses 74 and engage behind the shoulders 76 and are held against longitudinal displacement. The strips 85 are bent upon themselves to provide two-layer V-shaped heads 89, and these V-shaped heads have angular extensions 90 at their free ends. The outer layer extends beyond the head 89 and provides an extension 91 bearing against the edge wall of the casing 75. The extensions 91 serve to apply an inward resilient pressure to the spring contacts 84 adjacent to their free ends. The spring contacts 84 have a vertical dimension equal to that of the web 70 and the lateral displacement of the spring contacts and the flanges 86 is prevented by means of a cover 92, inserted within the marginal edge of the casings 67 and 75. This cover is held in the closed position by a pin 93, having a press fit in an opening 94 in the web 70. This cover rests upon the web 70 and has an opening 95 to receive a bolt 96, as shown.

The socket 29 arranged to the left, Figures 1 and 11, and its casing 35 passes through an opening 36' in the support 26. The horizontal casing 30 is arranged above the support 26 and is clamped to the support 26 by a bolt 97, extending through the vertical slot 33 and engaging a nut 98, arranged within the horizontal slot 34, Figure 11. In connection with the socket 29 to the left, the two terminal plates 60 have screws or binding posts 99 engaging in the screw-threaded openings 65. The socket 29 to the right, has its casing 35 extending through an opening 36' in the support 26, Figure 20. The switch socket has its transverse casing 67 mounted upon the top of the transverse casing 30 and the bolt 96 clamps the transverse casings 67 and 30 together and also clamps the casing 30 to the support 26, Figure 21. The bolt 96 passes through the vertical slot 33 and the head of the bolt engages beneath the support 26, as shown. The support 26 has an opening 100 for receiving the casing 83' of the thermostatic switch held within the socket and the end of this thermostatic switch casing is arranged near or in thermal contact with the glass envelope of the fluorescent lamp to be heated thereby. In connection with the socket 29, to the right, the terminal plate 87, Figure 22, is engaged by a long screw 101, engaging the terminal plate 60 of the spring contact 54. The lugs 73 project down into the recess 37 to clamp the terminal plate 60 against upward movement. The binding posts or screws 99 and the binding posts or screws 88' engage within screw-threaded openings formed in adjacent terminal plates.

When the socket 29 to the left and the socket 29 to the right are secured in place, as explained, a wire 103, Figures 1 and 25, is passed through the slot 32 and is clamped to one terminal plate 60. A wire 104 is clamped to the companion terminal plate 60. The wire 104 is clamped to one terminal plate 60 of socket 29 to the right and the companion terminal plate 60 is connected with one terminal plate 87 of the switch socket by means of the bolt 101. A wire 105 is clamped to the companion terminal plate 87. Wires 103 and 105 lead to the opposite poles of the source of current. Wire 104 may have a manual switch 106 connected therein.

When the manual switch is closed, the electrodes 27' of the fluorescent lamp are connected in series, the thermostatic switch being now closed. The electrodes 27' generate the heat which vaporizes the mercury and when this vaporization has been effected, the switch 83 opens, and the circuit is made from one electrode to the other through the mercury vapor, and the lamp then operates in the conventional manner.

It is to be understood that the form of my invention herewith shown and described is to be taken as a preferred example of the same, and that various changes in the shape, size and arrangement of parts may be resorted to, without departing from the spirit of the invention or the scope of the subjoined claims.

Having thus described my invention, I claim:
1. A socket for a fluorescent lamp or the like having a pair of terminals at its end, said socket having elongated slots to receive the terminals, spring contacts within the socket, at least one spring contact including a metal strip bent back upon itself to provide a two-layer V-shaped head having an angularly disposed extension arranged to contact with the wall of the socket, said V-shaped head forming a recess having its open side face inwardly, the two layers of the V-shaped head contacting with each other for increasing the stiffness of such head which must be flexed before the terminal can be removed therefrom when the angularly disposed extension contacts with the wall of the socket, the outer layer of the V-shaped head being continued to form a leaf spring having its free end spaced from the metal strip and arranged to bear against the wall of the socket to force the V-shaped head inwardly into engagement with the terminal, and means to secure the opposite end of the strip of each contact in place within the socket.

2. A socket for a fluorescent lamp or the like having a pair of terminals at its end, said socket having spaced separate curved concentric slots to receive the terminals and a main slot leading into corresponding ends of the curved slots, the opposite ends of the curved slots being closed so that such closed ends serve to limit the shifting movement of the terminals in one direction in said curved slots, spring contacts within the socket, each spring contact including a metal strip bent back upon itself to provide a two-layer V-shaped head having an angularly disposed free extension arranged to contact with the wall of the socket, said V-shaped head forming a recess having its open side facing inwardly, the two layers of the V-shaped head contacting with each other for increasing the stiffness of such head which head must be flexed before the terminal can be removed therefrom, the free angularly disposed extension then contacting with the wall of the socket during the flexing of the V-shaped head, the outer layer of each V-shaped head being continued to form a leaf spring having its free end spaced from the metal strip and arranged to bear against the wall of the socket to force the V-shaped head inwardly into engagement with the terminal, the V-shaped heads being arranged near the closed ends of the curved slots, and means to secure the opposite end of the strip of each contact in place within the socket.

HENRY KERSHAW.

References Cited in the file of this patent

UNITED STATES PATENTS

| Number | Name | Date |
|---|---|---|
| 2,037,562 | Chirelstein | April 14, 1936 |
| 2,274,089 | O'Brien | Feb. 24, 1942 |
| 2,276,829 | De Reamer | Mar. 17, 1942 |
| 2,284,367 | Bryant et al. | May 26, 1942 |
| 2,292,060 | De Reamer et al. | Aug. 4, 1942 |
| 2,356,601 | MacCarthy | Aug. 22, 1944 |
| 2,436,661 | Naster | Feb. 24, 1948 |
| 2,529,122 | Zelov | Nov. 7, 1950 |

FOREIGN PATENTS

| Number | Country | Date |
|---|---|---|
| 577,337 | Great Britain | May 14, 1946 |